United States Patent
Ito et al.

(10) Patent No.: US 6,524,669 B2
(45) Date of Patent: Feb. 25, 2003

(54) LAYERED HEAT-SHRINKABLE FILMS AND LABELS FOR BOTTLES

(75) Inventors: Hideki Ito, Inuyama (JP); Norimi Tabota, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/943,495

(22) Filed: Aug. 30, 2001

(65) Prior Publication Data

US 2002/0045055 A1 Apr. 18, 2002

(30) Foreign Application Priority Data

Aug. 31, 2000 (JP) ........................ 2000-263290
Oct. 3, 2000 (JP) ........................ 2000-303933

(51) Int. Cl.$^7$ ................. B32B 7/00; B32B 27/06; B32B 27/16; B32B 27/36
(52) U.S. Cl. ............. 428/34.9; 428/35.7; 428/212; 428/480; 428/515; 428/910; 528/302
(58) Field of Search .............. 428/212, 34.9, 428/35.7, 480, 515, 910; 528/302

(56) References Cited

U.S. PATENT DOCUMENTS 4,985,538 A 1/1991 Fukuda et al.

FOREIGN PATENT DOCUMENTS

| JP | 58-64958 A | 4/1983 |
| JP | 7077757 B | 4/1989 |
| JP | 1055506 A1 | 11/2000 |
| JP | 2000-327806 | 11/2000 |

*Primary Examiner*—Vivian Chen
(74) *Attorney, Agent, or Firm*—Kenyon & Kenyon

(57) ABSTRACT

Layered heat-shrinkable films disclosed herein are suitable for labels on PET bottles requiring label fitting and heat shrinkage at a high speed, which film has at least three layers, that is, both outer layers and an intermediate layer, wherein the heat shrinkability in the main shrinkage direction of the film is 20% or higher after treatment in hot water at 70° C. for 5 seconds and 35% to 55% after treatment in hot water at 75° C. for 5 seconds and 50% to 60% after treatment in hot water at 80° C. for 5 seconds, and the compressive strength of a label formed from the film meets the following formula (1): $Y>X^{2.2}$ where Y is compressive strength (mN) and X is film thickness ($\mu$m).

5 Claims, 1 Drawing Sheet

LAYERED HEAT-SHRINKABLE FILMS AND LABELS FOR BOTTLES

FIELD OF INVENTION

The present invention relates to layered heat-shrinkable films, particularly to layered heat-shrinkable films suitable for label use. More particularly, it relates to layered heat-shrinkable films for label use, which films cause only rare occurrence of wrinkles, shrinkage spots and strains by heat shrinkage, and in which films high compressive strength is compatible with bonding properties when non-halogen solvents are used.

BACKGROUND OF THE INVENTION

For heat-shrinkable films, particularly heat-shrinkable films for use as labels to be fitted on the barrels of PET bottles, there have been mainly used, for example, films made of polyvinyl chloride or polystyrene. However, polyvinyl chloride has recently raised a problem that chlorine-containing gases will be evolved in the incineration for disposal, and polystyrene has a problem that printing is difficult. Further, in the collection and recycling of PET bottles, labels made of resins other than PET, such as polyvinyl chloride or polystyrene, should be separated. Therefore, heat-shrinkable films made of polyesters having no such problems have attracted considerable attention.

However, most of the heat-shrinkable polyester films rapidly shrink, so that wrinkles, shrinkage spots and strains will be left after shrinkage and the films will easily be broken by impact from outside after shrinkage. For these reasons, they are not satisfactory as shrinkable films for labels.

To avoid part of such drawbacks, JP-B 7-77757 discloses a method for improving shrinkage finish by making remarkably small breaking strength in a direction perpendicular to the main shrinkage direction.

Further, JP-A 58-64958 discloses a method for improving shrinkage finish by making small orientation return stress.

However, the films obtained by these methods cannot exhibit sufficient shrinkage finish for use on small PET bottles, which should be allowed to pass through a shrinkage tunnel for a short time, and therefore, they are also not satisfactory as shrinkable films. More specifically, when cylindrical labels formed from the shrinkable films are fitted on PET bottles and then allowed to shrunk by heat treatment, the labels may cause occurrence of wrinkles, shrinkage spots and strains by shrinkage.

Further, the production line for filling beverages in PET bottles has been accelerated, and therefore, heat-shrinkable labels have been required to have suitability for high-speed fitting, in addition to, of course, good shrinkage finish. In other words, as shown in FIGS. 1 and 2, when PET bottle 1 is fitted with label 2 at a high speed with compression member 3, the label may be bent to cause fitting failure, if the label has poor suitability for high-speed fitting. The fitting suitability of labels mainly depends on the stiffness of base films and is achieved by an increase in film thickness, which is, however, attended by harmful effects. For example, an increase in film thickness leads to an increase in film weight, which deteriorates handling properties, and to an increase in production cost.

In addition, for bonding solvents used in the formation of films into a tube shape, halogen solvents have hitherto been widely used; however, there have been increasing cases in which non-halogen solvents are used from the viewpoint of safety and health. Non-halogen solvents have a tendency to decrease the bonding properties of films as compared with halogen solvents. If the solvent bonding properties of films is improved, some problems may be raised, for example, that the stiffness of films will be decreased.

SUMMARY OF THE INVENTION

The present invention, which can solve the above problems, has been made to provide layered heat-shrinkable films which have excellent suitability for high-speed fitting and exhibit excellent shrinkage finish and which can be bonded with non-halogen solvents, without being made thicker as compared with the conventional heat-shrinkable films, in all applications including labels for small PET bottles.

Thus the present invention provides layered heat-shrinkable films, each having at least three layers, or both outer layers and an intermediate layer, wherein the heat shrinkability in the main shrinkage direction of the film is 20% or higher after treatment in hot water at 70° C. for 5 seconds and 35% to 55% after treatment in hot water at 75° C. for 5 seconds and 50% to 60% after treatment in hot water at 80° C. for 5 seconds and the compressive strength of a label formed from the film meets the following formula (1):

$$Y > X^{2.2} \tag{1}$$

where Y is compressive strength (mN) and X is film thickness ($\mu$m).

In a preferred embodiment, the glass transition temperature of said both outer layers is lower than that of said intermediate layer.

In a more preferred embodiment, said both outer layers are made of a polyester resin containing isophthalic acid at 13 mol % or higher and adipic acid at 2.6 mol % or higher in all acid components and butanediol at 10 mol % or higher in all glycol components and said intermediate layer is made of a polyester resin containing isophthalic acid at 13 mol % or higher and adipic acid at lower than 2.1 mol % in all acid components and butanediol at lower than 9 mol % in all glycol components.

In a preferred embodiment, the bonding strength when said both outer layers of the film are bonded together with a solvent is 4.5 N/15 mm or higher.

The present invention further provides heat-shrinkable labels made of the above layered heat-shrinkable films.

DETAILED DESCRIPTION OF THE INVENTION

Figure 1:
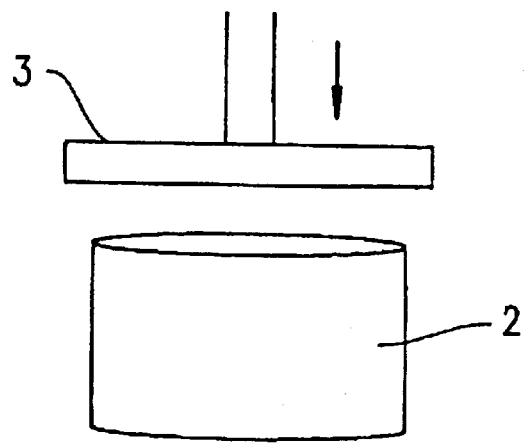
FIG. 1 is a schematic view showing the situation of a layered heat-shrinkable film when fitted on a PET bottle.
Figure 1:
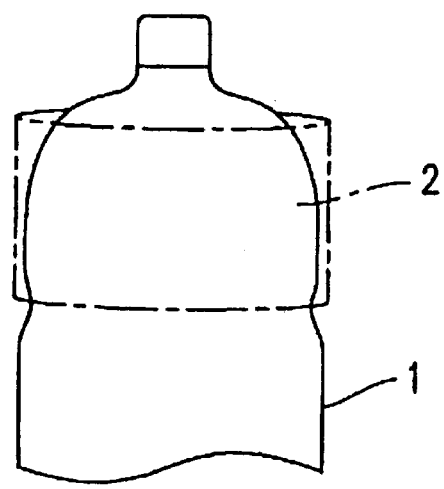
Figure 2:
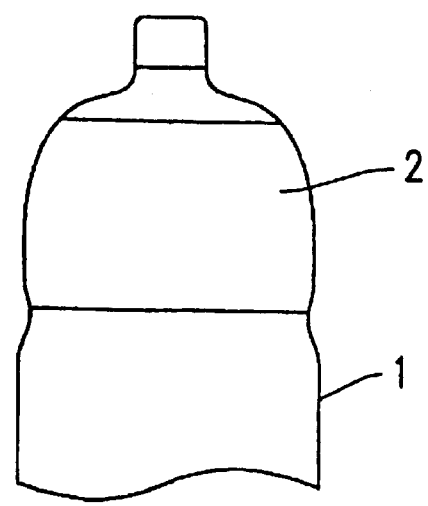
FIG. 2 is a schematic view showing the situation of a layered heat-shrinkable film after fitted on a PET bottle and shrunk.

The layered heat-shrinkable films of the present invention each have at least three layers, that is, both outer layers and an intermediate layer, and the film function can be divided between said both outer layers and said intermediate layer. In these films, the bonding properties between the films can be compatible with the total strength of the films by making the glass transition temperature of said both outer layers lower than that of said intermediate layer.

For the layered heat-shrinkable films of the present invention, the compressive strength of a label formed from the film meets the following formula (1):

$$Y > X^{3.3} \quad (1)$$

where Y is compressive strength (mN) and X is film thickness (μm).

The preferred compressive strength of a label formed from the film meets the following formula (2):

$$Y > 1.1 X^{2.2} \quad (2)$$

The compressive strength depends on the film thickness. From the viewpoint of suitability for high-speed fitting, when the compressive strength does not meet the above formula (1), there will possibly be raised a problem of label fitting failure.

For the layered heat-shrinkable films of the present invention, the film thickness is not particularly limited, but may preferably be 10 to 200 μm, more preferably 20 to 100 μm, as the heat-shrinkable films for labels, The layered heat-shrinkable films of the present invention may preferably be made of polyesters because such films have no problem on the evolution of chlorine-containing gasses in the incineration for disposal and they are suitable for recycling.

The layered heat-shrinkable films of the present invention may preferably be made of polyesters composed of dicarboxylic acid components and diol components as the constituent components.

The dicarboxylic acid components constituting the polyesters used in the present invention may include aromatic dicarboxylic acids such as terephthalic acid, isophthalic acid, naphthalenedicarboxylic acid and orthophthalic acid; aliphatic dicarboxylic acids such as adipic acid, azelaic acid, sebacic acid and decanedicarboxylic acid; and alicyclic dicarboxylic acids.

When the polyesters contain aliphatic dicarboxylic acids (e.g. adipic acid, sebacic acid, decanedicarboxylic acid), their contents are lower than 3 mol % (relative to the total amount of all dicarboxylic acid components used; this also holds in the following). For layered heat-shrinkable films obtained by the use of polyesters containing these aliphatic carboxylic acids at 3 mol % or higher, their elongation at break in a direction perpendicular to the main shrinkage direction after shrinkage treatment is easily decreased and their film stiffness in the high-speed fitting is insufficient.

The polyesters may preferably contain no three or more functional polycarboxylic acids (e.g., trimellitic acid, pyromellitic acid, their anhydrides), more preferably only at 3 mol % or lower. For layered heat-shrinkable films obtained by the use of polyesters containing these polycarboxylic acids, their elongation at break in a direction perpendicular to the main shrinkage direction after shrinkage treatment is easily decreased and their desired high shrinkability can hardly be attained.

The diol components constituting the polyesters used in the present invention may include aliphatic diols such as ethylene glycol, propanediol, butanediol, neopentyl glycol and hexanediol; alicyclic diols such as 1,4-cyclohexanedimethanol; and aromatic diols.

The polyesters used in the layered heat-shrinkable films of the present invention may preferably be those having glass transition temperatures (Tg) adjusted to 60° C. to 75° C. by the incorporation of at least one diol of 3 to 6 carbon atoms (e.g., propanediol, butanediol, neopentyl glycol, hexanediol).

For the purpose of obtaining layered heat-shrinkable films exhibiting particularly excellent shrinkage finish, neopentyl glycol may preferably be used as one of the diol components, more preferably at 15 to 25 mol % (relative to the total amount of all diol components; this also holds in the following).

The polyesters may preferably contain neither diols of 8 or more carbon atoms (e.g., octanediol), nor three or more functional polyhydric alcohols (eg., trimethylolpropane, trimethylolethane, glycerin, diglycerin), more preferably only at 3 mol % or lower. For layered heat-shrinkable films obtained by the use of polyesters containing these diols or polycarboxylic acids, the desired high shrinkability can hardly be attained.

The polyesters may preferably contain none of diethylene glycol, triethylene glycol, and polyethylene glycol, if possible. In particular, diethylene glycol may easily be formed as a by-product component in the polymerization of polyesters and therefore may easily be contained in the polyesters. For the polyesters used in the present invention, the diethylene glycol content may preferably be lower than 4 mol %.

The preferred acid components and the preferred diol components for the polyesters used in the present invention are as follows: For both outer layers, terephthalic acid is used as the main acid component, which is mixed with isophthalic acid at 13 mol % or higher and adipic acid at 2.6 mol % or are higher but lower than 5 mol %, whereas ethylene glycol is used as the main diol component, which is mixed with butanediol at 10 to 15 mol %. For an intermediate layer, terephthalic acid is used as the main acid component, which is mixed with isophthalic acid at 13 mol % or higher and adipic acid at 1 mol % or higher but lower than 2.1 mol %, whereas ethylene glycol is used as the main diol component, which is mixed with butanediol at 5 mol % or higher but lower than 9 mol %.

When two or more polyesters are used in admixture, the acid component contents and the diol component contents are those relative to the total amount of all acid components and the total amount of all diol components, respectively, both of which are contained in these polyesters, independently of whether or not transesterification has been carried out after the mixing.

To improve the self-lubricating properties of the layered heat-shrinkable films, inorganic lubricants such as titanium dioxide, fumed silica, kaolin and calcium carbonate; or organic lubricants such as long-chain fatty acid esters may preferably be added. The layered heat-shrinkable films of the present invention may further contain, if necessary, additives such as stabilizers, colorants, antioxidants, defoamers, antistatic agents and ultraviolet light absorbers.

The above polyesters can be prepared by polymerization according to the conventional methods; for example, the polyesters can be obtained direct esterification method in which dicarboxylic acids are directly reacted with diols or transesterification method in which dicarboxylic acid dimethyl esters are reacted with diols. The polymerization may be carried out in either of batch or continuous manner. The degree of polymerization for the polyesters is not particularly limited, but from the viewpoint of film formation, preferred polyesters have an intrinsic viscosity of 0.3 to 1.3 dl/g, particularly 0.5 to 3 dl/g.

The layered heat-shrinkable films have at least three layers, or both outer layers and an intermediate layer, said both outer layers each having a thickness of 0.1 μm or greater, more preferably 1 μm to 30 μm. When both outer layers each have a thickness of 0.1 μm or smaller, sufficient solvent bonding strength cannot be attained. When both outer layers each have a thickness of 30 μm or greater, the characteristics of a film, other than the solvent bonding properties, are affected, which is not preferred.

For the layered heat-shrinkable films of the present invention, the heat shrinkability in the main shrinkage direction of a film as calculated from the values of side length before and after shrinkage by treatment in hot water under no load by the equation: heat shrinkability=((side length before shrinkage−side length after shrinkage)/side length before shrinkage)×100 (%) should be 20% or higher, preferably 22% to 35%, after treatment in hot water at 70° C. for 5 seconds and 35% to 55%, preferably 40% to 50% after treatment in hot water at 75° C. for 5 seconds, and 50% to 60% after treatment in hot water at 80° C. for 5 seconds.

When the heat shrinkability in the main shrinkage direction of a film is lower than 20% after treatment in hot water at 70° C. for 5 seconds, labels made of such a film exhibit insufficient shrinkage at low temperatures, requiring the rise in temperature for shrinkage, which is not preferred. In contrast, when the heat shrinkability is higher than 50%, labels made of such a film cause jumping by heat shrinkage, which is also not preferred.

As described above, the heat shrinkability in the main shrinkage direction of a film should be 35% to 55% after treatment in hot water at 75° C. for 5 seconds. When the heat shrinkability is lower than 35%, labels made of such a film cause insufficient shrinkage at the mouth portions of bottles (more specifically, when such a film is fitted on articles such as bottles and allowed to pass through a shrinkage tunnel, the top and bottom edge portions of the label open like a flower petal, and the occurrence of shrinkage spots and wrinkles is easily caused), which is not preferred. In contrast, when the heat shrinkability is higher than 55%, labels made of such a film have a possibility of causing jumping because of their still having shrinkability after heat shrinkage, which is also not preferred.

Further, the heat shrinkability in the main shrinkage direction of a film should be 50% to 60% after treatment in hot water at 80° C. for 5 seconds. When the heat shrinkability is lower than 50%, labels made of such a film cause insufficient shrinkage at the mouth portions of bottles, which is not preferred. In contrast, when the heat shrinkability is higher than 60%, labels made of such a film have a possibility of causing jumping because of their still having shrinkability after heat shrinkage, which is also not preferred.

The following will describe a production process for the layered heat-shrinkable films of the present invention by reference to a specific example; however, it is not limited to this example.

First, the above polyester base materials are dried with a dryer such as a hopper dryer or paddle dryer, or a vacuum dryer, and melt at a temperature of 200° C. to 300° C. and extruded into a film shape. In the extrusion, any of the existing methods may be employed, including T-die method and tubular method. After extrusion, rapid cooling gives an unstretched film.

The resulting unstretched film is then stretched at a ratio of 1.05 or higher, preferably. 1.05 to 1.20, in the machine direction (ie., the direction of extrusion) at a temperature (e.g., 70° C. to 90° C.) of (Tg of polyesters−5° C.) or higher but lower than (Tg of polyesters+15° C.). The film is pre-heated and then stretched (primary stretching) at a ratio of 4.5 or higher, preferably 4.7 to 5.2, in the transverse direction (in the main shrinkage direction). In this case, preheating of the film makes it possible to suppress shrinkage, thereby increasing the stiffness of the film. The film is then further stretched (secondary stretching) at a ratio of 1.05 in the transverse direction at a temperature of 65° C. to 85° C. to give a layered heat-shrinkable film.

The two-stage stretching in such a manner also makes it possible to increase the stiffness of the film, thereby causing no problem in the high-speed shrinkage and high-speed fitting.

The method of stretching involves, in addition to stretching in the machine direction, stretching in the transverse direction with a tenter, which achieves two-stage stretching. The two-stage stretching in such a manner may be carried out by either of the sequential biaxial stretching method or the simultaneous biaxial stretching method, and the resulting film may be further stretched, if necessary, in the machine or transverse direction.

For attaining the purpose of the present invention, the transverse direction is practical as the main shrinkage direction; therefore, the above explanation is for an example of the film formation method when the main shrinkage direction is taken in the transverse direction. However, the film formation in which the main shrinkage direction is taken in the machine direction can also be carried out according to the procedures of the above method, except that the direction of stretching is turned 90 degrees around the line perpendicular to the film surface.

In the present invention, an unstretched film obtained from polyesters may preferably be stretched at a temperature of (Tg of the polyesters−5° C.) or higher but lower than (Tg of the polyesters+15° C.).

When the unstretched film is stretched at a temperature of lower than (Tg of the polyesters −5° C.), it is difficult to attain heat shrinkability such as some of the claimed requirements of the present invention and the film has deteriorated transparency, which is not preferred.

When the unstretched film is stretched at a temperature of (Tg of the polyesters+15° C.) or higher, the film thus obtained exhibits insufficient film stiffness in the high-speed fitting and the thickness distribution of the film is remarkably deteriorated, which is also not preferred.

For the layered heat-shrinkable films of the present invention, the thickness distribution of the film as calculated from the values of film thickness by the equation: thickness distribution=((maximum thickness−minimum thickness)/average thickness)×100 (%) may preferably be 6% or lower, more preferably 5% or lower.

The films having a thickness distribution of 6% or lower are easy to achieve the superposition of colors in the three-color printing carried out, for example, in the evaluation of shrinkage finish, whereas the films having a thickness distribution of higher than 6% are not preferred from the viewpoint of color superposition.

To make even thickness distribution in the layered heat-shrinkable films of the present invention, the unstretched film may preferably be heated to a prescribed film temperature at a low air flow rate with a heat transmission coefficient of 0.0013 cal/cm$^2$·sec·°C. (0.0054 J/cm$^2$·sec·K) or lower in the step of preheating to be carried out prior to the step of stretching when the unstretched film is stretched in the transverse direction with a tenter.

To prevent heat evolution in the films during stretching to reduce the unevenness of film temperature in the width direction of the films, the heat transmission coefficient in the step of stretching may preferably be conditioned to 0.0009 cal/cm$^2$·sec·°C. (0.0037 J/cm$^2$·sec·K) or higher, more preferably 0.0011 to 0.0017 cal/cm$^2$·sec·°C. (0.0046 to 0.0071 J/cm$^2$·sec·K).

When the heat transmission coefficient in the step of preheating is higher than 0.0013 cal/cm$^2$·sec·°C. (0.0054 J/cm$^2$·sec·K) or when the heat transmission coefficient in the step of stretching is lower than 0.0009 cal/cm$^2$·sec·°C. (0.0037 J/cm$^2$·sec·K), thickness distribution will hardly become even, so that it causes the deviation of patterns in the superposition of many colors when the resulting film is processed in the multi-color printing, which is not preferred.

The heat-shrinkable labels of the present invention can be prepared by cutting the layered heat-shrinkable films of the present invention into a rectangule of a prescribed size, rolling up the rectangular film in a cylindrical shape, bonding the end portions of the film to form a tube-shaped article, and cutting this article into a prescribed size. The method of bonding is not particular limited; for example, a solvent or a swelling agent is applied to at least one of the surfaces to be bonded together in the film, and these surfaces of the film is bonded together before dry.

EXAMPLES

The present invention will hereinafter be further illustrated by some examples; however, the present invention is not limited to these examples.

The methods of evaluation for the layered heat-shrinkable films of the present invention are as follows:

(1) Heat shrinkability

A film was cut into a square of 10 cm×10 cm with two sides parallel to the machine direction and to the transverse direction, respectively. This sample was heat-shrunk by immersion under no load in hot water at a prescribed temperature ±0.5° C. for a prescribed period of time and then measured for side lengths in the machine direction and in the transverse direction, respectively. The heat shrinkability was calculated from the measured values of side lengths according to the following formula (2). The direction of either side corresponding to the larger value of heat shrinkability was referred to as the main shrinkage direction.

Heat shrinkability=((side length before shrinkage−side length after shrinkage)/side length before shrinkage)×100 (%)    (2)

(2) Shrinkage finish

A film was printed with three inks of glass, gold and white colors, available from TOYO INK MANUFACTURING CO., LTD., and formed into a cylindrical label of 216 mm in circumferential length along the main shrinkage direction and 50 mm in height along the direction perpendicular thereto by solvent bonding the end portions of the film with 1,3-dioxolane (a margin for applying the solvent was 5 mm). The label was fitted on a 500-ml round bottle (20.6 cm in height and 6.5 cm in barrel diameter; the same bottle as manufactured by YOSHINO KOGYOSHO K.K. and used for "Afternoon Tea" from KIRIN BEVERAGE), and heat-shrunk by allowing the labeled bottle to pass through a steam tunnel (model: SH-1500-L) available from FUJI ASTEC, INC., at a zone temperature of 80° C. for a passage time of 2.5. This testing was carried out for 20 different samples of each film. The shrinkage finish was determined by visual observation and evaluated at two ranks on the following criteria:

Good: no occurrence of wrinkles, jumping, or insufficient shrinkage

Poor: occurrence of wrinkles, jumping, or insufficient shrinkage (3) Compressive strength A film was cut into a rectangule, of which end portions were solvent bonded together with 1,3-dioxolane (a margin for applying the solvent was 5 mm) to give a heat-shrinkable label of 175 mm in width when folded flatly into two and 120 mm in height. The label was formed into a square tube of 87.5 mm in one side of the base and 120 mm in height, and then measured for the maximum resistance (compressive strength in mN) when compressed in the direction of its height at a cross head speed of 200 mm/min. with a strograph (model: V10-C) available from TOYOSEIKI K.K. This testing was carried out for 5 different samples of each film.

(4) Glass transition temperature (Tg)

Using a differential scanning calorimeter (model: DSC220) available from SEIKO INSTRUMENTS & ELECTRONICS LIMITED, an unstretched film of 10 mg in weight was heated from −40° C. to 120° C. at a heating rate of 20° C./min. to draw a heat absorption curve, from which the glass transition temperature (Tg) was determined. Two tangent lines were drawn before and after the inflection point on the heat absorption curve, and the point of their intersection was regarded as the glass transition temperature (Tg).

(5) Thickness distribution

A film was cut into a size of 5 cm×50 cm along the machine direction and along the transverse direction, respectively. This sample was measured for thickness (the number of measured points=20) with a contact thickness meter (model: KG60/A) available from ANRITSU CORPORATION. For each sample, the thickness distribution (ie., scattering of thickness) was calculated by the following formula (3). The measurement was repeated for fifty samples of each film, and the mean value of thickness distribution was determined and evaluated on the following criteria:

Thickness distribution=((maximum thickness−minimum thickness)/average thickness)×100 (%)    (3)

Good: 6% or lower

Fair: higher than 6% but lower than 10%

Poor: 10% or higher (6) Solvent bonding properties (bonding strength)

Using a tube-shape forming machine, a film was formed into a tube shape by applying 1,3-dioxolane in an application amount of 3 g/m² to one surface of the film and then immediately bonding the end portions of the film together (before the applied solvent dried). From the bonded portions of the resulting tube-shaped film, a sample was cut into a size of 15 mm in width and 50 mm in length. The bonded portions of the sample were removed in the circumferential direction of the above tube-shaped film, and the bonding strength was determined for 5 different samples of each film and evaluated on the following criteria:

Good: bonding strength=4.5 N/15 mm or higher

Fair: bonding strength=2.5 to 4.5 N/15 mm

Poor: 2.5 N/15 mm or lower (7) Intrinsic viscosity

First, 200 mg of a sample was added to 20 ml of a mixed solvent of phenol and tetrachloroethane (50/50), and the mixture is heated at 110° C. for 1 hour, followed by measurement of intrinsic viscosity at 30° C.

The polyesters used in the examples and comparative examples were as follows:

Polyester A: polyethylene terephthalate (intrinsic viscosity (IV), 0.75 dl/g)

Polyester B: a polyester composed of terephthalic acid at 78 mol % and isophthalic acid at 22 mol % and ethylene glycol (IV, 0.72 dl/g)

Polyester C: a polyester composed of terephthalic acid at 65 mol %, isophthalic acid at 10 mol % and adipic acid at 25 mol % and butanediol (IV, 0.77 dl/g)

Polyester D: a polyester composed of terephthalic acid and ethylene glycol at 70 mol % and neopentyl glycol at 30 mol % (IV, 0.72 dl/g)

Polyester E: polybutylene terephthalate (IV, 1.20 dl/g)

Example 1

A polyester prepared by mixing 20 wt % polyester A, 65 wt % polyester B and 15 wt % polyester C for both outer layers, and a polyeser prepared by mixing 20 wt % polyester A, 75 wt % polyester B and 5 wt % polyester C for an intermediate layer were independently melt at 280° C. and co-extruded from a T-die, followed by rapid cooling on chill rolls, to give an unstretched film.

The unstretched film was stretched at a ratio of 1.1 in the machine direction at 80° C. with a heat transmission coefficient of 0.0201 cal/cm$^2$·sec·°C. (0.0837 J/cm$^2$·sec·K), preheated until the film temperature came to 88° C. with a heat transmission coefficient of 0.0008 cal/cm$^2$·sec·°C. (0.0033 J/cm$^2$·sec·K), stretched at a ratio of 4.6 in the transverse direction at 70° C. (primary stretching) using a tenter with a heat transmission coefficient of 0.0012 cal/cm$^2$·sec·°C. (0.0050 J/cm$^2$·sec·K), heat-treated at 70° C. for 10 seconds, and further stretched at a ratio of 1.1 in the transverse direction at 68° C. (secondary stretching) with a heat transmission coefficient of 0.0012 cal/cm$^2$·sec·°C. (0.0050 J/cm$^2$·sec·K) to give a layered heat-shrinkable film of 50 μm in thickness.

Example 2

A layered heat-shrinkable film of 50 μm in thickness was obtained in the same manner as described in Example 1, except that a polyester prepared by mixing 6 wt % polyester A, 79 wt % polyester B and 15 wt % polyester C was used for both outer layers, and a polyester prepared by mixing 6 wt % polyester A, 89 wt % polyester B and 5 wt % polyester C was used for an intermediate layer, and primary stretching in the transverse direction was carried out at 71° C.

Example 3

A layered heat-shrinkable film of 50 μm in thickness was obtained in the same manner as described in Example 1, except that stretching in the machine direction was carried out at a ratio of 1.5.

Example 4

A polyester prepared by mixing 19 wt % polyester A, 66 wt % polyester B and 15 wt % polyester C for both outer layers, and a polyester prepared by mixing 21 wt % polyester A, 74 wt % polyester B and 5 wt % polyester C for an intermediate layer were independently melt at 280° C. and co-extruded from a T-die, followed by rapid cooling on chill rolls, to give an unstretched film.

The unstretched film was stretched at a ratio of 1.1 in the machine direction at 80° C. with a heat transmission coefficient of 0.0201 cal/cm$^2$·sec·°C. (0.0837 J/cm$^2$·sec·K), preheated until the film temperature came to 89° C. with a heat transmission coefficient of 0.0008 cal/cm$^2$·sec·°C. (0.0033 J/cm$^2$·sec·K), stretched at a ratio of 4.7 in the transverse direction at 70° C. (primary stretching) using a tenter with a heat transmission coefficient of 0.0012 cal/cm$^2$·sec·°C. (0.0050 J/cm$^2$·sec·K), heat-treated at 70° C. for 10 seconds, and further stretched at a ratio of 1.1 in the transverse direction at 68° C. (secondary stretching) with a heat transmission coefficient of 0.0012 cal/cm$^2$·sec·°C. (0.0050 J/cm$^2$·sec·K) to give a three-layer heat-shrinkable polyester film of 50 μm in thickness.

Example 5

A three-layer heat-shrinkable polyester film of 50 μm in thickness was obtained in the same manner as described in Example 4, except that a polyester prepared by mixing 6 wt % polyester A, 79 wt % polyester B and 15 wt % polyester C was used for both outer layers, and a polyester prepared by mixing 21 wt % polyester A, 74 wt % polyester B and 5 wt % polyester C was used for an intermediate layer, and primary stretching in the transverse direction was carried out at 72° C.

Example 6

A three-layer heat-shrinkable polyester film of 50 μm in thickness was obtained in the same manner as described in Example 4, except that stretching in the machine direction was carried out at a ratio of 1.5.

Comparative Example 1

A three-layer heat-shrinkable polyester film of 50 μm in thickness was obtained in the same manner as described in Example 1, except that the temperature of primary stretching in the transverse direction was 87° C.

Comparative Example 2

A three-layer heat-shrinkable polyester film of 50 μm in thickness was obtained in the same manner as described in Example 1, except that an unstretched film was stretched at a ratio of 1.0 in the machine direction and then stretched once at a ratio of 4.0 in the transverse direction at 70° C.

Comparative Example 3

A one-layer heat-shrinkable polyester film of 50 μm in thickness was obtained in the same manner as described in Example 1, except that a polyester prepared by mixing 25 wt % polyester A, 50 wt % polyester D and 25 wt % polyester E was used and an unstretched film was stretched at a ratio of 1.1 in the machine direction and then stretched once at a ratio of 5.0 in the transverse direction at 70° C.

Comparative Example 4

A one-layer heat-shrinkable polyester film of 50 μm in thickness was obtained in the same manner as described in Comparative Example 3, except that a polyester prepared by mixing 20 wt % polyester A, 70 wt % polyester B and 10 wt % polyester C was used and the temperature of stretching in the transverse direction was 74° C. The unstretched film has a Tg of 66° C.

For the films obtained in Examples 1–6 and Comparative Examples 1–4, the polyester composition and the glass transition temperature for each layer are listed in Table 1, and the results of evaluation are shown in Table 2.

TABLE 1

| | | Base materials (wt %) | | | | | Glass transition temperature (° C.) |
|---|---|---|---|---|---|---|---|
| | | Polyester A | Polyester B | Polyester C | Polyester D | Polyester E | |
| Example 1 | Both outer layers | 20 | 65 | 15 | — | — | 57 |
| | Intermediate layer | 20 | 75 | 5 | — | — | 69 |
| Example 2 | Both outer layers | 6 | 79 | 15 | — | — | 57 |
| | Intermediate layer | 6 | 89 | 5 | — | — | 69 |
| Example 3 | Both outer layers | 20 | 65 | 15 | — | — | 57 |
| | Intermediate layer | 20 | 75 | 5 | — | — | 69 |
| Example 4 | Both outer layers | 19 | 66 | 15 | — | — | 57 |
| | Intermediate layer | 21 | 74 | 5 | — | — | 69 |
| Example 5 | Both outer layers | 6 | 79 | 15 | — | — | 57 |
| | Intermediate layer | 21 | 74 | 5 | — | — | 69 |
| Example 6 | Both outer layers | 19 | 66 | 15 | — | — | 57 |
| | Intermediate layer | 21 | 74 | 5 | — | — | 69 |
| Comp. Ex. 1 | Both outer layers | 20 | 65 | 15 | — | — | 57 |
| | Intermediate layer | 20 | 75 | 5 | — | — | 69 |
| Comp. Ex. 2 | Both outer layers | 20 | 65 | 15 | — | — | 57 |
| | Intermediate layer | 20 | 75 | 5 | — | — | 69 |
| Comp. Ex. 3 | Single layer | 25 | 70 | 10 | — | — | 69 |
| Comp. Ex. 4 | Single layer | 20 | — | — | 50 | 25 | 66 |

Polyester A: TPA//EG = 100//100 (mol %);
Polyester B: TPA/IPA//EG = 78/22//100;
Polyester C: TPA/IPA/AA//BD = 65/10/25//100;
Polyester D: TPA/AA//EG = 70/30//100;
Polyester E: TPA//BD = 100//100

TABLE 2

| | Stretch ratio | | Stretching temperature (° C.) | | Heat-shrinkability in the main shrinkage direction (%) | | | Shrinkage finish properties | Compressive strength (mN) | Thickness distribution | Bonding strength (N/15 mm) |
|---|---|---|---|---|---|---|---|---|---|---|---|
| | MD | TD[1] | MD | TD[2] | 70° C. | 75° C. | 80° C. | | | | |
| Example 1 | 1.1 | 4.6/1.1 | 80 | 70/68 | 27 | 46 | 55 | good | 6600 | good | good (5.7) |
| Example 2 | 1.1 | 4.6/1.1 | 80 | 71/68 | 30 | 46 | 52 | good | 6700 | good | good (6.0) |
| Example 3 | 1.5 | 4.6/1.1 | 80 | 70/68 | 27 | 46 | 55 | good | 6600 | good | good (4.7) |
| Example 4 | 1.1 | 4.7/1.1 | 80 | 70/68 | 27 | 48 | 57 | good | 6800 | good | good (5.0) |
| Example 5 | 1.1 | 4.7/1.1 | 80 | 72/68 | 30 | 47 | 53 | good | 6900 | good | good (5.5) |
| Example 6 | 1.5 | 4.7/1.1 | 80 | 70/68 | 27 | 47 | 56 | good | 6800 | good | good (5.0) |
| Comp. Ex. 1 | 1.1 | 4.6/1.1 | 80 | 87/68 | 22 | 40 | 50 | fair | 5200 | fair | good (6.0) |
| Comp. Ex. 2 | 1.0 | 4.0 | 80 | 70 | 25 | 38 | 48 | fair | 5300 | good | good (6.0) |
| Comp. Ex. 3 | 1.1 | 5.0 | 80 | 70 | 27 | 46 | 54 | good | 5100 | good | good (5.0) |
| Comp. Ex. 4 | 1.1 | 5.0 | 80 | 74 | 28 | 46 | 55 | good | 6300 | good | fair (3.8) |

[1] A single value means one-stage stretching and two values before and after the slash correspond to primary stretching and secondary stretching, respectively.

As can be seen from Table 2, all the films obtained in Examples 1–6 exhibited good shrinkage finish, and had sufficient compressive strength, good thickness distribution and good bonding properties for non-halogen solvents. This indicates that the layered heat-shrinkable films of the present invention have high quality and high practical availability, and there-fore, they are particularly suitable for shrinkable labels.

In contrast, the heat-shrinkable film obtained in Comparative Example 1 exhibited poor shrinkage finish and had poor thickness distribution, the heat-shrinkable films obtained in Comparative Examples 2 and 3 had poor compressive strength, and the heat-shrinkable film obtained in Comparative Example 4 had poor bonding properties for non-halogen solvents. Thus all the heat-shrinkable films obtained in Comparative Examples had low quality and low practical availability.

According to the present invention, layered heat-shrinkable films which can exhibit good shrinkage finish with only rare occurrence of wrinkles, shrinkage spots, strains and insufficient shrinkage by heat shrinkage, and which can be bonded with non-halogen solvents, and which have film stiffness to endure high-speed fitting and have shrinkage performance giving high shrinkability in a short time.

Therefore, the layered heat-shrinkable films of the present invention are suitable for labels on pet bottles requiring label fitting and shrinkage at a high speed.

What is claimed is:

1. A layered heat-shrinkable film having at least three layers, or both outer layers and an intermediate layer, wherein the heat shrinkability in the main shrinkage direction of the film is 20% or higher after treatment in hot water at 70° C. for 5 seconds and 35% to 55% after treatment in hot water at 75° C. for 5 seconds and 50% to 60% after treatment in hot water at 80° C. for 5 seconds, and the compressive strength of a label formed from the film meets the following formula (1):

$$Y > X^{2.2} \tag{1}$$

where Y is compressive strength (mN) and X is film thickness ($\mu$m).

2. A layered heat-shrinkable film according to claim 1, wherein the glass transition temperature of said both outer layers is lower than that of said intermediate layer.

3. A layered heat-shrinkable film according to claim 2, wherein said both outer layers are made of a polyester resin containing isophthalic acid at 13 mol % or higher and adipic acid at 2.6 mol % or higher in all acid components and butanediol at 10 mol % or higher in all glycol components and said intermediate layer is made of a polyester resin containing isophthalic acid at 13 mol % or higher and adipic acid at lower than 2.1 mol % in all acid components and butanediol at lower than 9 mol % in all glycol components.

4. A layered heat-shrinkable film according to claim 1, wherein the bonding strength when said both outer layers are bonded together with a solvent is 4.5 N/15 mm or higher.

5. A heat-shrinkable label made of a layered heat-shrinkable film according to claim 1.

* * * * *